(12) United States Patent
Holmdahl et al.

(10) Patent No.: US 10,497,964 B1
(45) Date of Patent: Dec. 3, 2019

(54) METHODS AND SYSTEMS FOR A BIDIRECTIONALLY FLEXIBLE BATTERY

(71) Applicant: Amazon Technologies, Inc., Seattle, WA (US)

(72) Inventors: Bryan Holmdahl, Santa Clara, CA (US); James Robert Lim, San Jose, CA (US); Jonathan Fought, Santa Clara, CA (US); Yuting Yeh, Sunnyvale, CA (US); David Wang, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 15/349,803

(22) Filed: Nov. 11, 2016

(51) Int. Cl.
  *H01M 10/04* (2006.01)
  *H01M 2/02* (2006.01)
  *H01M 10/48* (2006.01)
  *G06F 1/16* (2006.01)

(52) U.S. Cl.
  CPC ........ *H01M 10/045* (2013.01); *G06F 1/1626* (2013.01); *G06F 1/1635* (2013.01); *H01M 2/0275* (2013.01); *H01M 10/48* (2013.01); *H01M 2220/30* (2013.01)

(58) Field of Classification Search
  CPC ................. H01M 10/0525; H01M 2220/30
  See application file for complete search history.

(56) References Cited

U.S. PATENT DOCUMENTS

| | | | |
|---|---|---|---|
| 2010/0015529 A1* | 1/2010 | Kim ................. | H01M 10/0413 429/246 |
| 2015/0188185 A1* | 7/2015 | Taylor .............. | H01M 10/0472 429/153 |

* cited by examiner

*Primary Examiner* — Olatunji A Godo
(74) *Attorney, Agent, or Firm* — Eversheds Sutherland (US) LLP

(57) ABSTRACT

Systems, methods, and computer-readable media are disclosed for a flexible battery. The systems, methods, and computer-readable media described herein may improve user experiences and prolong the battery's life. In an example embodiment described herein, a flexible battery may include a battery laminate comprising a cathode layer having a first surface coated with an active material and a second surface coated with inactive material, wherein the second surface comprises a first segment oriented in a first orientation and a second segment connected to the first segment and oriented in a second orientation different from the first orientation.

20 Claims, 7 Drawing Sheets

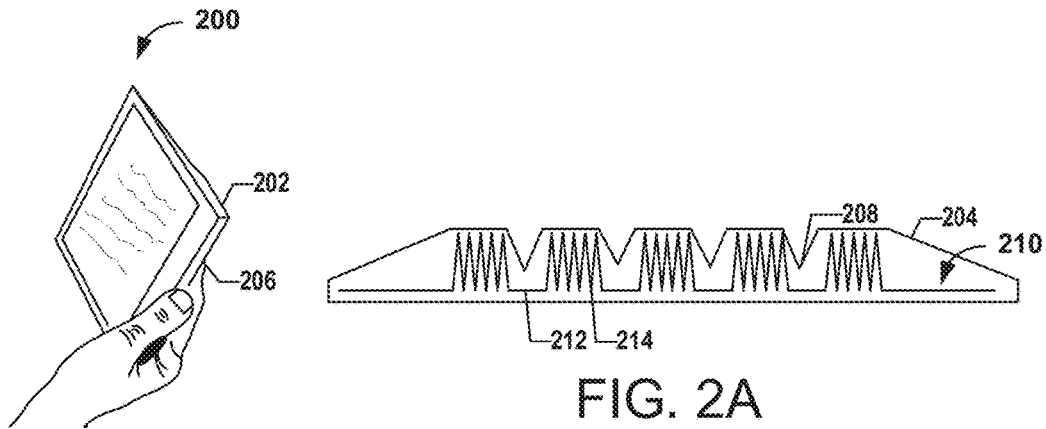
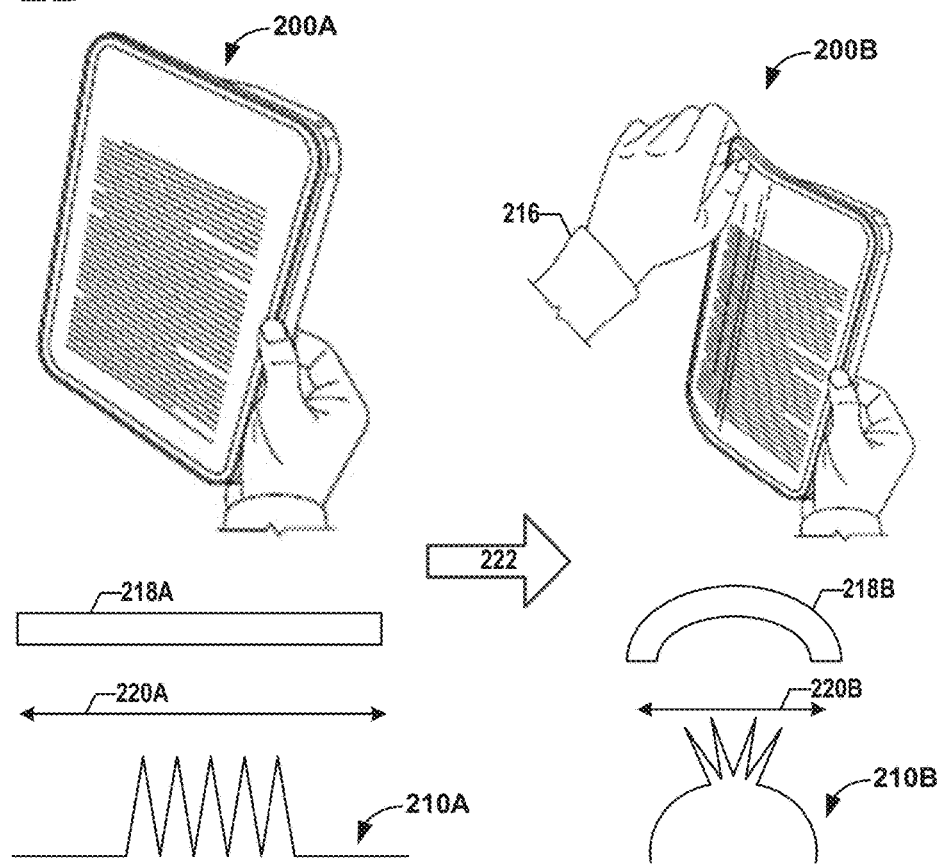
FIG. 2B
FIG. 2C

METHODS AND SYSTEMS FOR A BIDIRECTIONALLY FLEXIBLE BATTERY

BACKGROUND

Electronic devices are now an integral part of everyday life. Many of the electronic devices that are widely used are mobile devices (e.g., mobile phones, laptops, tablets, and/or the like). These devices require power to operate. Often power is provided to such devices, at least partially, via a battery. Such batteries may be designed to include different features (e.g., long life, flexibility, small size, and/or the like). Such features may directly relate to the user experience. For example, the battery may define how long an electronic device can operate before recharging. In some instances, different desirable features may be difficult to incorporate into a single battery. For example, the size of a battery may likely limit the amount of charge it can hold or how long an electronic device can operate without recharging. The size of the battery may be, for example, limited by an enclosure of a device being powered by the battery.

Naturally, the ability to enhance the performance of batteries without sacrificing other features similar to the features described above can enhance the user experience and satisfaction. Accordingly, there exists a dire market need for systems and methods that can improve the performance of batteries while maintaining features similar to the features described above.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 2A-2C illustrate example views of a device according to one or more example embodiments of the disclosure.

DETAILED DESCRIPTION

Figure 1A:
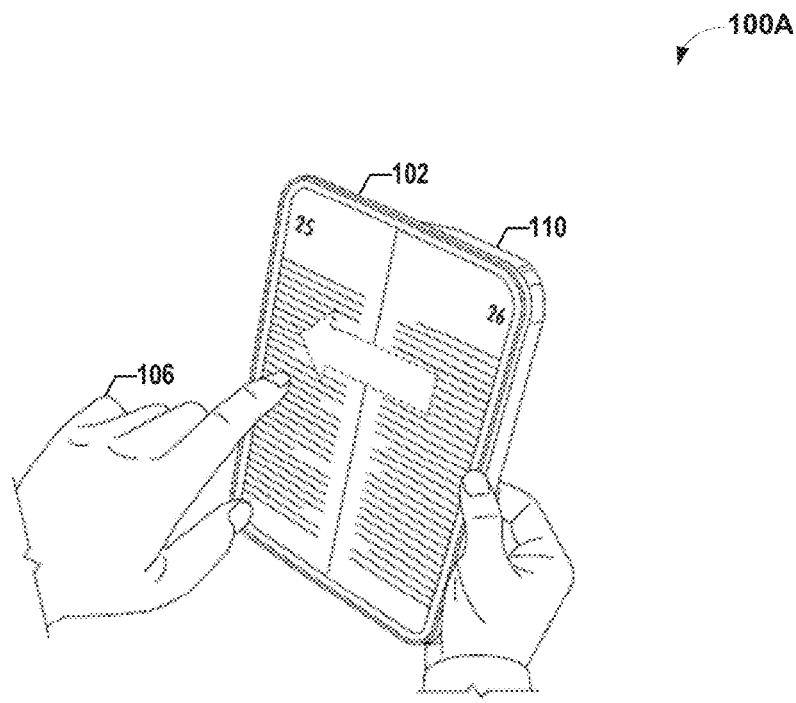
FIGS. 1A-1B illustrate an environment where one or more devices may operate in accordance with one or more example embodiments of the disclosure.

This disclosure relates to, among other things, systems, methods, computer-readable media, techniques, and methodologies for a flexible battery having an improved performance.

Generally, a battery (e.g., a pouch battery) may be configured to facilitate powering mobile electronic devices (e.g., mobile phones, tablets, remote controllers and/or the like) and/or other electronic devices (desktop computers, alarm systems, and/or the like).

Batteries may have one or more elastic surfaces (e.g., an elastic shell). For example, some portions of a battery may be less or more rigid than other portions of the battery. In one embodiment of the disclosure, a flexible battery is configured for placement in a flexible bendable housing. The flexible bendable housing may be, for example, a housing for a mobile device, such as a tablet in an illustrative embodiment, which tablet may be configured for bending in a particular direction. The housing may include mechanical elements that prevent or resist the housing from bending in directions different from the particular direction. In some implementations, the user may be able to provide user interactions to the tablet by, for example, bending the tablet.

However, in order to facilitate operation and/or manufacturing of a bendable tablet, internal components of the tablet may accommodate the bending of the tablet and/or tablet housing. For example, a battery powering the tablet may be bendable in one or more directions. In one implementation, the battery and the tablet may be bendable about a vertical access of the tablet. In one implementation, cathodes and anodes (e.g., layers) may be configured to accommodate bending in two or more direction. For example, the flexible battery may be a battery having a battery laminate that include a plurality of layers (e.g., cathode, anode, separator) folded into a zigzag or an accordion shape. The zigzag or accordion shape may facilitate bending of the battery. For example, when the flexible battery is bent in, for example, forward direction about a longitudinal axis of the battery, a first portion of the battery may experience tension from being stretched while a second portion may experience compression. The zigzag or accordion shape design allows the folded layers of the battery to move freely within a containing pouch when the battery is bent. This design minimizes the structural stress on the battery when bent because the folded portions of the battery laminate can move freely within the pouch. Accordingly, the flexible battery may maintain electrical connections easier during the bending of the flexible battery. Also, the overall stress on the battery during the bending may also be reduced or eliminated according to this design.

Other constraints may also be considered. In some implementations, it may be desirable to maximize the amount of charge a battery can hold and/or the battery life. Generally, the size of the battery is proportional to an amount of charge a battery can hold. Therefore, in some implementations, it is desirable to fully utilize space available within the tablet housing for the battery in order to increase the amount of charge that the battery can hold. Methods and systems are described herein for generating and manufacturing a battery according to the example parameters above.

Embodiments of the disclosure may improve the user experience and increase the amount of charge a flexible battery can hold. Additionally, embodiments of the disclosure also provide for a device design that increases reliability and reduces malfunctions of the device. For example, a flexible device may withstand more force (e.g., drops) than a non-flexible device before breaking. In one implementation, the flexible battery described is configured for placement in a bendable tablet housing. In one implementation, the battery may be configured for bending in at least one direction. In one implementation, the battery may be configured for bending in at least two directions. For example, the tablet and the battery within may be bendable about a vertical, longitudinal or transverse axis of the tablet in a first direction (e.g., forward) and a second direction (e.g., backwards). As the zigzag or accordion design allows for bending the battery in multiple directions, the battery may be placed within a tablet bendable in at least two directions. The above allows for placement of flexible batteries in bendable tablets or bendable tablet housings and ensures safe operation of the bendable tablet.

In on implementation, the user experience may be improved by allowing the user to provide instructions to the tablet by bending the tablet. Additionally, the amount of charge held by the tablet or the battery of the tablet may be increased without increasing the size of the tablet or the tablet housing. In turn, this also enhances the user experience. In some implementations, the flexible housing may include a flexible display device. For example, the flexible housing may be for a bendable tablet having a bendable display device (e.g., touchscreen)

FIG. 1A illustrates an environment 100A where one or more devices may operate in accordance with one or more example embodiments of the disclosure. FIG. 1A depicts a tablet 102. In one implementation, the tablet 102 may include an ergonomic grip 110. A user may hold the tablet 102 using the ergonomic grip 110. In some implementations, the ergonomic grip 110 may contain one or more buttons configured to receive user input (not shown). In some examples, the tablet 102 may be used as an E-reader to read or view content, such as a book. The user may provide user input 106 to cycle or flip through pages. For example, the user may swipe across a touchscreen (forward or backwards) to flip through pages as shown in FIG. 1A. However, swiping across the touchscreen may be cumbersome when the user desires to flip through pages quickly.

Figure 1B:
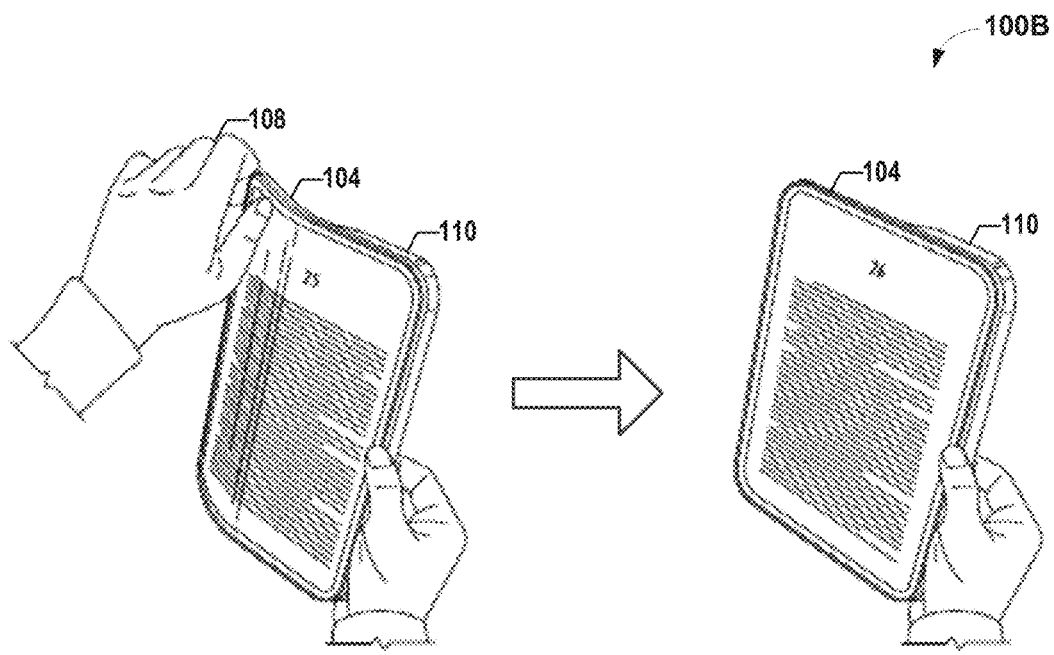

FIG. 1B illustrates an environment 100B where one or more devices may operate in accordance with one or more example embodiments of the disclosure. FIG. 1B depicts a flexible bendable tablet 104. In the depicted embodiment, the flexible bendable tablet 104 is being bent in a first direction (forward). In some implementations, the flexible bendable tablet 104 may be bent in a second direction. For example, the flexible bendable tablet 104 may be bent in a direction opposite to the depicted direction. In one example, the user may bend the flexible bendable tablet 104 forward to view a next page of a book, and bend the flexible bendable tablet 104 backwards to view a previous page of the book. The flexible bendable tablet 104 may include an ergonomic grip 110. The ergonomic grip 110 may house or include, at least a portion of, a flexible bendable battery (not shown). The flexible bendable battery may be configured to bend in the direction depicted in FIG. 1B and also in an opposite direction.

In one implementation, the flexible bendable battery may include interconnected stacks (e.g., zigzag shaped stacks). In one implementation, the interconnected stacks may be thicker within the portion of the tablet housing that includes the ergonomic grip 110 than in a portion of the tablet housing that does not include the ergonomic grip 110. For example, the battery may be thinner at the depicted bent portion of the tablet. In one implementation, the interconnected stacks may include fewer layers at the depicted bent portion than at the ergonomic grip 110 portion. The user may provide user input 108 via bending the tablet 104. The user input 108 may cause the tablet to display, for example, the next page of the book or the next item in a sequence (for example, search results). In some implementations, bending the tablet 104 or holding the tablet in the bent position cause pages of the book to be displayed quickly and consecutively in succession, for example, scrolling page to page automatically. Similarly, straightening or unbending the tablet 104 may cause the consecutive display of pages to be halted. For example, the tablet may remain displaying a current page. Similarly, in some implementations, the user may bend the tablet 104 in a direction opposite to the depicted direction to consecutively display previous pages. In some implementations, a tablet may be configured to receive and process user inputs similar to user input 106 and/or user input 108. For example, in such an implementation, a user may be able to flip or scroll through pages by providing either user input 106 or user input 108.

The tablet 104 may include one or more monitoring modules (e.g., sensors). The monitoring module may be configured to monitor the flexible battery. For example, the monitoring module may monitor the pressure of or within the flexible battery. The monitoring module may also monitor the performance of the battery, the speed of discharge and other parameters. Such parameters may also be compared to performance thresholds. Once one of the parameters exceed the threshold, the monitoring module may provide a message to the tablet 104. The tablet 104 may in turn display the message. In addition, a record may be created and stored locally to the device or remotely, for example, in connection with a user account.

In some implementations, the tablet 104 may mechanically prevent the bending of the tablet 104. For example, the housing may include one or more springs that prevent the bending of the tablet 104 in particular directions and/or in any direction. In one implementation, the springs may prevent the tablet from being bent in directions other than one or more particular directions selected by design. In some implementations, the springs may be activated mechanically to prevent the tablet 104 from being bent. Other mechanical elements may be used to prevent the bending of the tablet 104. For example a sliding rod may be engaged and disengaged electronically to prevent or allow bending of tablet 104. For example, as the rod is retracted the tablet 104 may be bendable. However, when the rod is engaged the tablet 104 may be rigid or unbendable. In a different example, a ratchet like component may allow mechanical slip in at least one direction and prevent mechanical slip in at least one other direction. For example, the ratchet like component may allow mechanical slip in a first direction and prevent mechanical slip in all other directions.

In some embodiments, the structure of the battery may dictate whether the battery is bendable. For example, as described herein a bidirectional flexible battery may be manufactured such that a battery laminate including a plurality of layers (e.g., cathode, anode, and separator) is folded into a zigzag or an accordion shape. The zigzag laminate may include a plurality of laminate portions facing opposite directions and separated by an acute angle. For example, the zigzag laminate may include a first surface portion of a first segment of the laminate facing a second surface portion of a second laminate segment, as depicted for example, in FIG. 3A-3B. During the bending of such battery portions of the zigzag laminate may be compressed while other portions are extended or separated. This minimizes the stress on the laminate. For example, as the battery is bent, segments of the zigzag laminate may be extended while other segments may be compressed. For example, with the segments of the zigzag laminate that may be extended, the segments move so that the angles between segments facing one another of the laminate may be increased to accommodate the bending and stretching of the battery. Conversely, with the segments of the zigzag laminate that may be compressed or brought closer together, the segments move so that the angles between segments facing one another in the opposite direction may decrease. However, based at least in part on the zigzag laminate, the stress induced on the battery laminate may be minimized. This design not only allows for bidirectional bending of the flexible battery, it also allows for increasing utilization of the available space for placement of a battery, for example, by accommodating longer battery laminates or multiple stacks of battery laminates. In turn, this may increase the amount of charge a battery can hold.

Figure 4A:
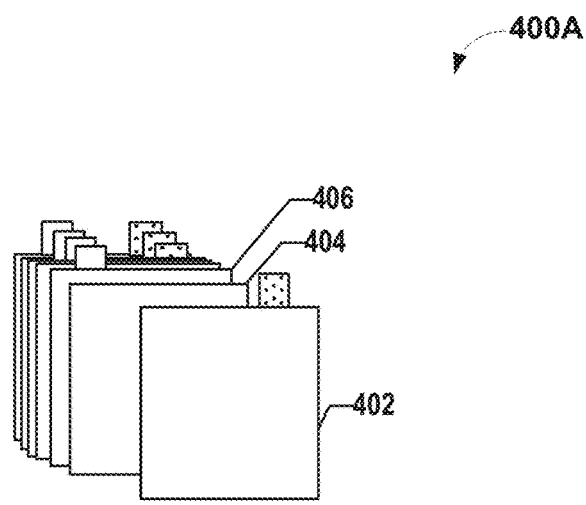
FIGS. 4A-4C illustrate example processes for manufacturing a device according to one or more example embodiments of the disclosure.
Figure 4B:
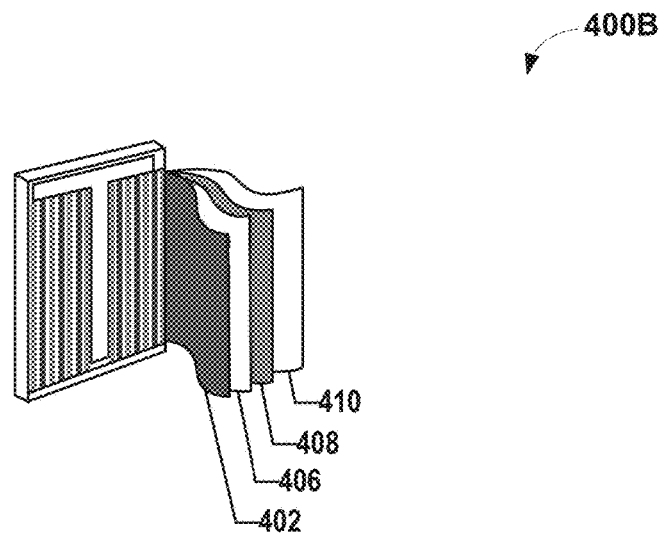
Figure 4C:
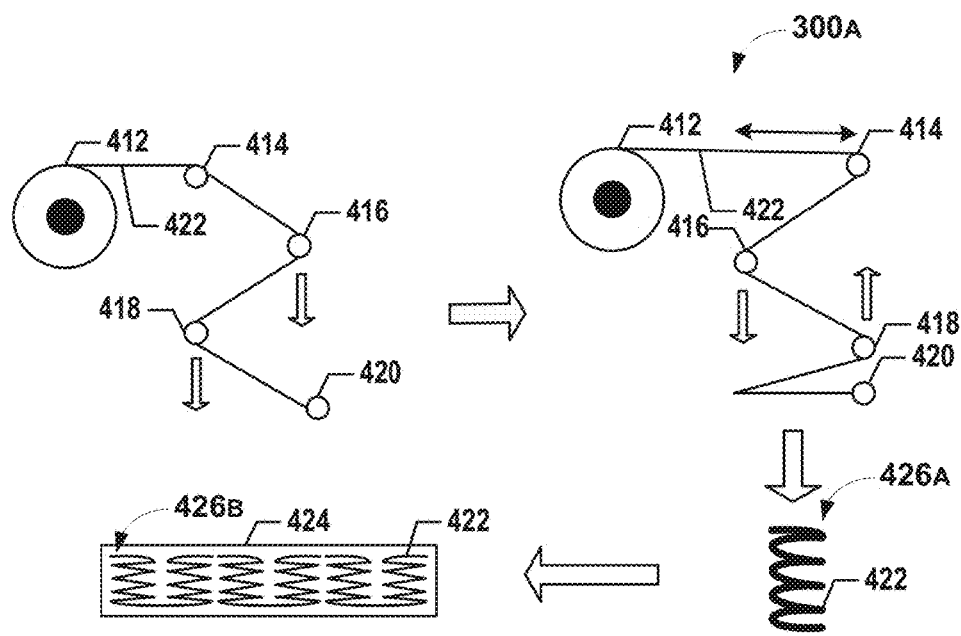

In one implementation, the battery may be manufactured by a stacking technique. In a different implementation, the battery may be manufactured by a winding technique for winding a battery laminate and/or strip. In some implementations, a plurality of moveable or stationary mandrels may be used to wind the battery. The mandrels may be arranged such that the battery is wound in the zigzag or accordion arrangement described herein. FIG. 4C depicts an example mandrel configuration for winding a battery according to the above parameters.

Illustrative Device Architecture

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMCs), secure digital (SD) memory cards, SmartMedia cards, CompactFlash (CF) cards, memory sticks or memory apparatus, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Bidirectional Bendable Device and Battery

FIGS. 2A-2C illustrate example perspective and cross-sectional views of a device 200 according to one or more example embodiments of the disclosure. The device 200 may be, for example, a tablet. The device 200 may include a flexible display device or element for viewing content, such as pages containing textual data and/or graphical data. The flexible display device or element may be bendable. The device 200 may also include a grip portion 202. The grip portion 202 may include an ergonomic grip for holding the device. In some implementations, the device 200 may include one or more buttons 206 for receiving user interactions. The buttons, for example, may allow for changing the volume of the device, scrolling through pages and/or the like.

FIG. 2A depicts an example enclosure 204 for the flexible battery. The flexible battery may comprise a battery laminate 210 having a zigzag or accordion shape as depicted. The battery laminate 210 may comprise a cathode layer and an anode layer separated by a separator layer. See, for example, FIG. 3. The laminate 210 may include a plurality of folded portions 214 (also referred to herein as zigzag or accordion portions), and a plurality of straight or unbent portions 212. In one implementation, the enclosure 204 may include a plurality of relief cuts, such as grooves 208. The enclosure may include a first lateral edge and a second lateral edge as depicted (e.g., side edges). In one implementation, the enclosure 204 may be the grip portion 202 (not shown) and may further include a pouch around the laminate 210 (not shown). In a different implementation, the enclosure 204 may be a pouch for the battery laminate 210. Yet in a different implementation, the enclosure 204 may be a portion of the enclosure of device 200. The grooves 208 may facilitate bending of the enclosure 204 and the laminate 210. The enclosure 204 may snap or spring back into its original or relaxed position once the enclosure is released after being bent. In some implementations, the straight portions 212 may be replaced with other folded zigzag portions that are smaller than the folded portions 214. For example, the height of the folded portions may vary to maximize utilization of space within enclosure 204. For example, as depicted, the battery design described herein allows for inserting a portion of the battery into ribbed spaces and other oddly shaped spaces that would not traditionally be occupied by a battery. Therefore, the battery design described herein allows for increasing the length of the battery laminate and/or increase the volume occupied by the battery laminate, and in turn, increase the amount of charge a battery within enclosure 204 can hold.

FIG. 2C depicts unbent device 200A being bent at bending step 222 into bent device 200B. As described above, user interactions may be provided to the device 200A by bending the device. An unbent battery pouch 218A has a first lateral length 220A. Once the bending step 222 is applied, the pouch is bent into pouch 218B having a second lateral length of 220B. The battery laminate 210A may include a plurality of layers (e.g., cathode, anode, and separator) that may be located within the pouch 218A. Once the bending step 222 is applied the battery laminate 210B is bent into an arcuate configuration. The bending of the laminate causes segments of the zigzag or folded portions to flare in while other segments are extended or separated from one another, resulting in, for example, a semicircular configuration. For example, the angles between consecutive zigzag segments may change when the battery is bent as depicted. For example, those angles facing one direction will increase, while those angels facing the opposite direction will decrease. It is important to note that the bending of the battery minimizes or eliminates the mechanical stress on the battery because of the zigzag arrangement. The zigzag arrangement allows the battery laminate to move freely within the pouch 218B when the bending step 222 is applied. Accordingly, the laminate may move when the bending step 222 is applied, reducing the amount of stress on the laminate by the increasing and decreasing the opposing angles of the zigzag configuration, which reducing the amount of compression and extension forces on the laminate. Once the bending of the device is stopped, the laminate may return back to its original shape and position.

With reference to FIG. 2C, the elements 200A, 218A, 220A and 210A are associated with the tablet at rest (e.g., unbent, no external force applied and/or the like). The device 200B shows the bending of the device in the particular direction. The tablet may have a maximum allowable bend displacement (e.g., the distance moved by one end of the device 200B relative to the other during the bending). The bend displacement may be defined in distance. For example the bend displacement may be 0.1 in, 0.2 in, 0.4 in, 0.5 in, 1 in, 2 in and/or the like. In some implementations, the device 200 may be bent in directions other than the depicted direction. The maximum bend displacement may be determined based on, for example, the battery and the design parameters of the battery. A bend determination module may monitor the bending of the device 200. The bend determination module may comprise one or more sensors and may determine the bend displacement of the device 200 or the pressure applied onto device 200. In some implementations, the battery may be designed to support a large bending displacement safely. The pouch 218A and/or 218B may be designed to withstand the pressure associated with bending the battery accordingly. In other implementations, the pouch 218A and/or 218B may be designed to withstand less pressure associated with bending the battery or tablet device 200 in order to reduce the manufacturing cost of the battery. It should be understood that the battery may be designed to accommodate different features and parameters.

According to the above, a user may bend the device 200, and thus, the battery, in one or more directions in order to interact with the device 200. For example, the user may bend the device 200 via user input 108 (or bending step 222) to flip through pages forward or backwards. In some implementations, the device 200 may be a tablet. The user input 108 may cause the tablet to display the next page of a book. Similarly, bending the tablet in an opposite direction may cause the tablet to display the previous page of the book. In some implementations, bending the tablet or holding the tablet in the bent position causes the pages of the book to be displayed quickly and consecutively in succession. Similarly, straightening or unbending the tablet may cause the consecutive display to be halted. For example, the tablet may remain displaying a current page in response to being straightened or unbent. In some implementations, a tablet may be configured to receive and process user inputs similar to user input 106 and/or user input 108 as described above. For example, in such an implementation, a user may be able to flip through pages by providing either user input 106 or user input 108.

The device 200 may include one or more monitoring modules (e.g., sensors). The monitoring module may be configured to monitor the battery. For example, the monitoring module may monitor the pressure of or within the battery. The monitored pressure may be compared to a pressure threshold (e.g., 5 psi, 10 psi, 15 psi, 20 psi, 25 psi and/or the like). The device 200 may in turn display a message indicative of the pressure measurement.

In general, the terms processing device, computer, entity, system, and/or similar words used herein interchangeably may refer to, for example, one or more computers, computing entities, desktop computers, mobile phones, tablets, phablets, notebooks, laptops, distributed systems, gaming consoles, watches, televisions, dongles, servers or server networks, blades, gateways, switches, processing devices, processing entities, set-top boxes, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. Although the operations described herein may be described with reference to the device 200 and/or the battery, such operations may be performed by other suitable devices, such as the devices discussed above.

Figure 3A:
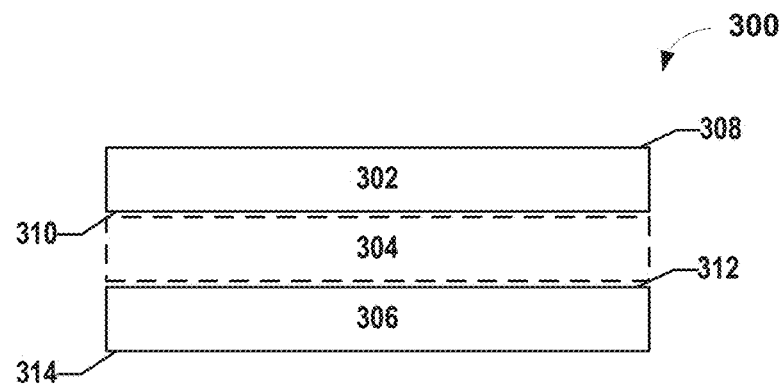
FIG. 3A-3B illustrates example views of a flexible battery according to one or more example embodiments of the disclosure.
Figure 3B:

FIGS. 3A-3B and 4A-4C relate to manufacturing a battery according to one or more embodiments of the disclosure. The flexible battery may be for example a pouch battery. FIGS. 3A-3B depict different views of a flexible battery having a zigzag or accordion shaped battery laminate similar to battery laminate 210. The battery laminate may include an anode layer 302, a separator layer 304, shown in phantom, and a cathode layer 306. In one implementation, the three layers may be pressed together and folded into the zigzag shape as depicted in FIGS. 3B. FIG. 3A shows a cross-sectional view of a portion of battery laminate layers 302, 304 and 306. The anode layer 302 may include a top surface 308 (e.g., outer surface) and a bottom surface 310 (e.g., inner surface). The top surface 308 may not be coated with an active material. The bottom surface 310 may be coated with an active material (e.g., anode material). The coated bottom surface may be in contact with the separator layer 304. Similarly, a top surface 312 (e.g., inner surface) of the cathode layer 306 may be coated with an active material (e.g., cathode material). A bottom surface 314 of the cathode layer 306 may not be coated with the active material. The bottom surface 310 of the anode layer 302 that is coated with active material may be separated from the top surface 312 of the cathode layer 306 by the separator layer 304. Accordingly, the portions of the cathode layer 306 and the anode layer 302 coated with the active material do not come in contact with one another. It is important to note that portions of the top surface 308 of the anode layer 302 may come in contact with one another top surface 308 of the anode layer 302 at the folded (e.g., zigzag) portions during bending of the battery laminate. However, these portions are not coated with the active material. Similarly, portions of the bottom surface 314 (e.g., outer surface) of the cathode layer 306 may come in contact with one another bottom surface 314 of the cathode layer 306 at the folded (e.g., zigzag) portions during bending of the battery laminate, but these portions are also not coated with the active material. In some implementations, the top portion 308 of the anode layer 302 and the bottom portion 314 of the cathode layer 306 may be coated with a separator material. For example, the anode layer may be a copper layer and the cathode layer may be an aluminum layer. In one implementation, an active material may be Lithium Cobalt Oxide (LCO), Lithium Nickel Cobalt Manganese Oxide or Nickel Cobalt Manganese (NCM) and/or Lithium Iron Phosphate (LFP). In one implementation, an inactive or a non-active material may be graphite. In one implementation, a separator layer may be a thermoplastic polymer layer.

The flexible battery may be, for example, manufactured using a stacking technique or a wrapping technique. Stacking techniques generally stack elements of the battery on top of one another during manufacturing. Wrapping techniques generally wrap elements of the battery around into a roll like structure. FIG. 4A illustrates an example of manufacturing a battery according to a stacking technique. Using the stacking technique, a cathode 406 may be placed in a first stack. A separator or a separator sheet 404 may be placed or stacked on top of the cathode 406. In turn, an anode 402 may be placed or stacked on top of the separator or separator sheet 404. A second separator sheet is then stacked or placed on the anode 402, followed by a second cathode. The process continues until the stack reaches a desired size. FIG. 4B illustrates manufacturing of a battery according to a wrapping technique. Battery elements (e.g., cathodes, anodes, separators) are manufactured in a contiguous manner such that when the elements are wrapped or wound around one or more mandrels create a stack similar to the stack of FIG. 4A. FIG. 4B depicts how elements of the battery are wound using a winding technique for winding a battery laminate or strip. The battery may include an anode layer 402 wound around a mandrel or itself, and a separator 406 wound around the anode layer 402. A cathode layer 408 may be wound around the separator 406 and a second separator 410 may be wound around the cathode layer 408. FIG. 4C illustrates manufacturing of a flexible battery according to a wrapping technique. A first mandrel 414 may pull a battery laminate 422 from a spool 412. The laminate 422 may include multiple layers as depicted in FIGS. 3A-3B. The laminate 422 may be pulled downward by moveable mandrel 416 and moveable mandrel 418. Mandrel 420 may secure an end of the laminate 422. The mandrels 416 and 418 may both move downwards to create a first zigzag or folded portion of the laminate. Moveable mandrel 416 may then be removed and may release the laminate, then move upwards to secure a new portion of the laminate. The moveable mandrel 416 may then move downward to create a second zigzag or folded portion. Mandrel 418 then moves upward and performs similar operations. The mandrels may alternate pulling down the laminate 422 to create the battery 426A (e.g., folded stack). The battery 426A may then be folded as depicted by 426B and placed within a pouch 424 (e.g., a plurality of folded stacks). In some implementations, this design enables increasing the battery charge without increasing the size of the pouch. In some implementations, the pouch 424 may be replaced by other enclosures. In some implementations, the folded battery 426B may be flexible and bendable in one or more directions. In some implementations, the laminate 422 may be folded into different configurations. For example, the laminate 422 may be folded to create battery stacks of different heights. In one example, the battery stacks may have an ascending or a descending step configuration. Accordingly, this manufacturing process can produce many different battery shapes and sizes. Once the winding process described is finished, the laminate is released from all mandrels and the battery may be flattened. For example the battery may be flattened via cold pressing, hot pressing or the like to create stack pressure and maintain the desired battery shape. In some implementations, the shape of the press may be similar to the desired shape of the batteries. The thickness of the battery at each portion is dictated by the number of layers included in each portion. Therefore, as described above, different designs can be achieved.

It should be understood that the winding and mandrel configurations discussed above are example embodiments. Other configurations that result in a zigzag or accordion battery may be used. Naturally, additional portions that may have different thicknesses may also be included in the battery. Also, batteries described herein may be designed and manufactured to fit different size constraints. For example, the grip portion described above where a portion of the battery is located may have different shapes and sizes. In one implementation, the grip portion may be cylindrical. The methods and systems above provide for increasing the utilization of space in such locations having different shapes and sizes, by increasing the size of the battery within such locations. In some implementations, the zigzag or accordion battery may manufacture as a single contiguous battery. In other implementations, the zigzag or accordion battery may be manufactured as multiple non-contiguous portions.

Computing Device

Figure 5:
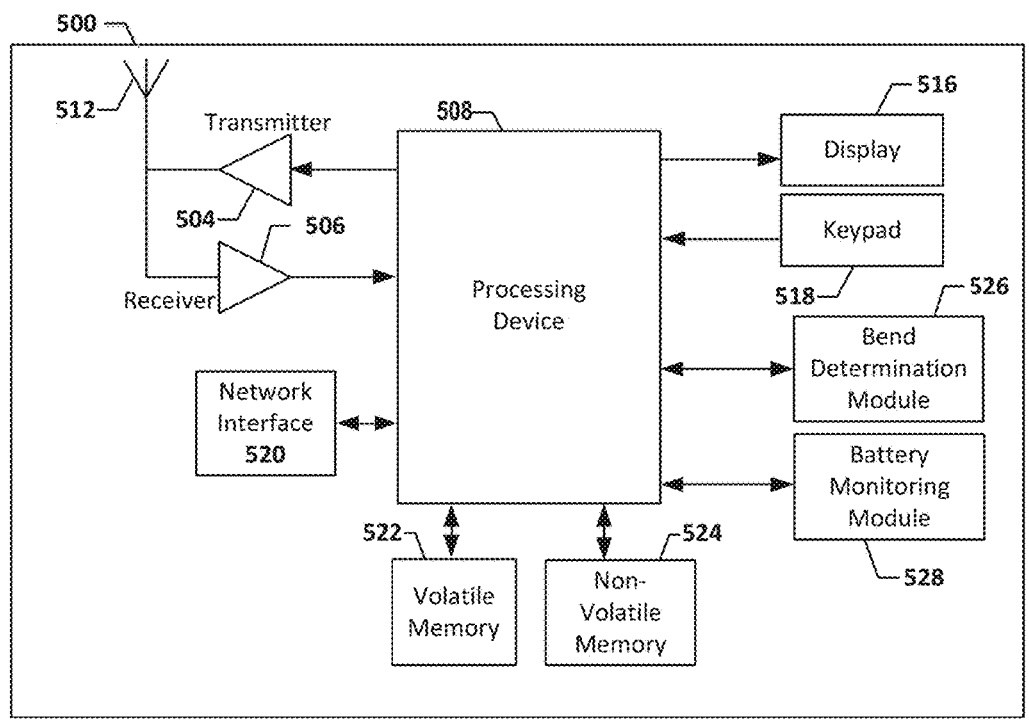
FIG. 5 illustrates an example schematic diagram of a computing device or entity according to one or more example embodiments of the disclosure.

FIG. 5 illustrates an example schematic diagram of a computing device 500 and/or an entity according to one or more example embodiments of the disclosure. In general, the computing device, computer, entity, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing device 500 can be operated by various parties and/or automatically. As shown in FIG. 5, the computing device 500 can include an antenna 512, a transmitter 504 (e.g., radio), a receiver 506 (e.g., radio), and a processing device 508 (e.g., CPLDs, microprocessors, multi-core processors, coprocessing entities, ASIPs, microcontrollers, and/or controllers) that provides signals to and receives signals from the transmitter 504 and the receiver 506, respectively.

The signals provided to and received from the transmitter 504 and the receiver 506, respectively, may include signaling information in accordance with air interface standards of applicable wireless systems. In this regard, the computing device 500 may be capable of operating with one or more air interface standards, communication protocols, modulation types, and access types. More particularly, the computing device 500 may operate in accordance with any of a number of wireless communication standards and protocols. In a particular embodiment, the computing device 500 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing device 500 may operate in accordance with multiple wired communication standards and protocols, via a network interface 520.

Via these communication standards and protocols, the computing device 500 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing device 500 can also download changes, add-ons, and updates, for instance, to its firmware, software (e.g., including executable instructions, applications, program modules), and operating system.

According to one embodiment, the computing device 500 may include location determining aspects, devices, modules, functionalities, and/or similar words used herein interchangeably. For example, the computing device 500 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing device 500 position in connection with a variety of other systems, including cellular towers, Wi-Fi access points, and/or the like. Similarly, the computing device 500 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing device 500 may also comprise a user interface (that can include a display 516 coupled to a processing device 508) and/or a user input interface (coupled to a processing device 508). For example, the user interface may be a user application, browser, user interface, and/or similar words used herein interchangeably executing on and/or accessible via the computing device 500 to interact with and/or cause display of information. The user input interface can comprise any of a number of devices or interfaces allowing the computing device 500 to receive data, such as a keypad 518 (hard or soft), a touch display, voice/speech or motion interfaces, or other input devices. In embodiments including a keypad 518, the keypad 518 can include (or cause display of) the conventional numeric (0-9) and related keys (#, *), and other keys used for operating the computing device 500 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The computing device 500 can also include volatile memory 522 and/or non-volatile memory 524, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the computing device 500. As indicated, this may include a user application that is resident on the respective device or accessible through a browser or other user interface for communicating with various other computing entities.

A bend determination module 526 may monitor the bending of the device 200. In one implementation, the bend determination module 526 may comprise one or more distance measuring sensors and may determine the bend displacement of the device 200. In one implementation, the bend determination module 526 may comprise one or more force measuring sensors and may determine the force applied onto device 200 during the bending. The bend determination module 526 may provide the bend displacement measurements and/or the force measurements to processing device 508. In turn, the processing device 508 may determine whether to change the page currently displayed. Similarly, the processing device 508 may determine a rate of displaying consecutive pages (e.g., speed of flipping through pages) based on the bend displacement and/or the applied force and/or pressure. The processing device 508 may then provide instructions to the display device 516 accordingly. The bend determination module 526 may also determine the direction of the bend, to determine whether to display a previous or a next consecutive page.

In some implementations, the battery may be designed to support a large bending displacement safely. In some implementations, the battery may be designed to withstand a large applied force for bending the device 200. The battery may be designed to withstand the pressure associated with bending the battery accordingly. In other implementations, the battery may be designed to withstand less pressure associated with bending the battery in order to reduce the manufacturing cost of the battery. It should be understood that the battery may be designed to accommodate different features and parameters. A battery monitoring module 528 may monitor the overall status of the battery to monitor the performance of the battery. As will be recognized, the above architectures and descriptions are provided for example purposes only and are not limiting to the various embodiments described herein.

Illustrative Processes

Figure 6:
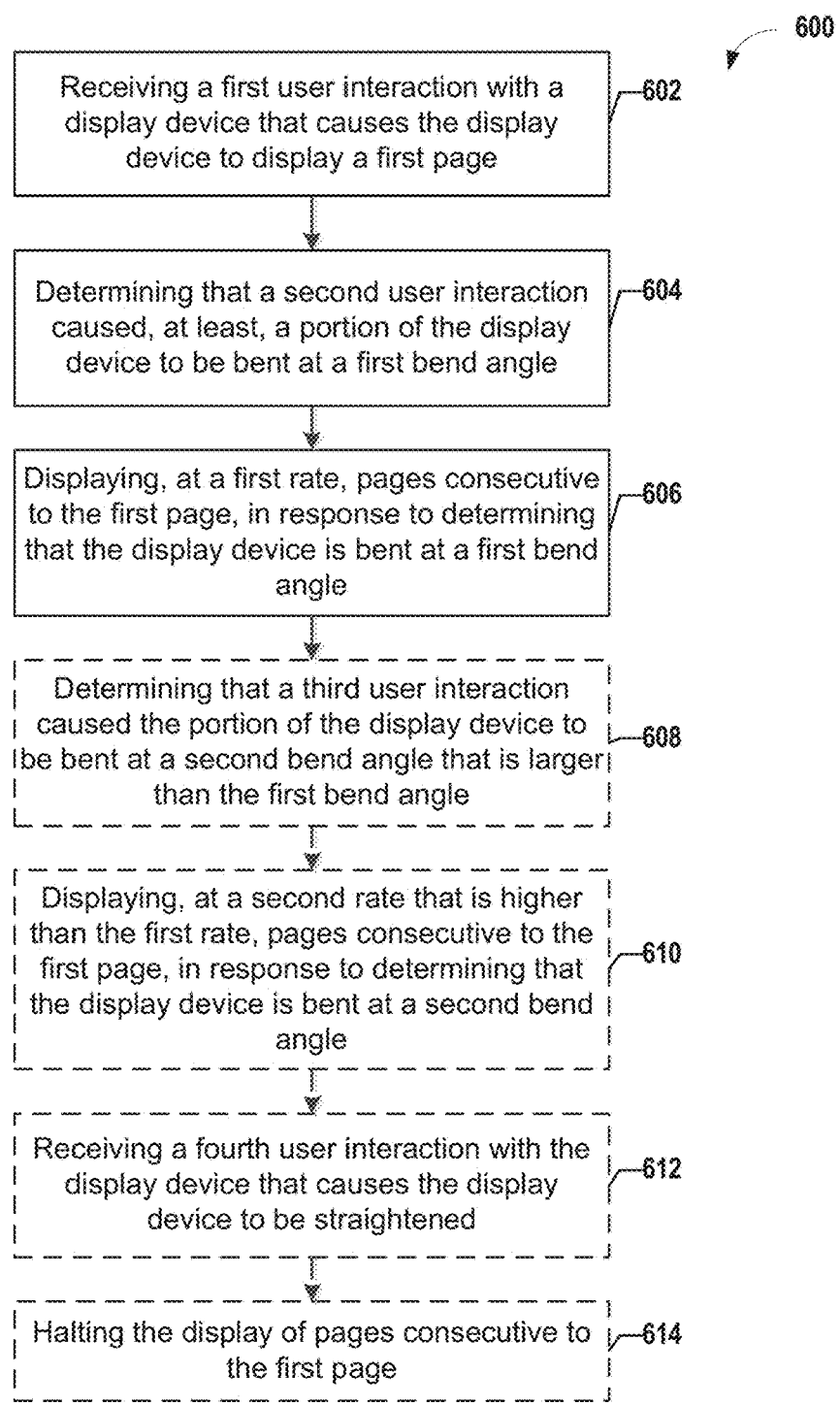
FIGS. 6-7 are flowcharts illustrating various procedures and operations that may be completed in accordance with various embodiments of the disclosure.

FIG. 6 is a flowchart of an example process 600 in accordance with various embodiments of the disclosure. The process 600 may be implemented by device 500, in an illustrative embodiment. The steps of process 600 may be executed by, at least in part, the bend determination module 526 and the battery monitoring module 528. The process 600 may begin with receiving a first user interaction with a display device that causes the display device to display a first page (602). In one implementation, the display device may be an E-reader or a tablet. For example, a user may interact with the E-reader or the tablet to view a first page of a book.

In one implementation, the user may utilize a touchscreen of the E-reader or the tablet to select a book and a page of the book to view.

The process 600 may continue with determining that a second user interaction caused, at least, a portion of the display device to be bent at a first bend angle (604). For example, the user may bend the display device in a first direction. A sensor and/or a module may determine the bending angle of the display device and the force applied onto the display device. In turn, the process 600 may continue with displaying, at a first rate, pages consecutive to the first page, in response to determining that the display device is bent at a first bend angle (606). For example, the E-reader or tablet may simulate flipping through consecutive pages of the book based on determining that one end of the E-reader or tablet is bent in a particular direction. In one implementation, each bending motion may cause a single page to be flipped. In a different implementation, a user may hold the bending motion to flip through a plurality of pages. A bend determination module 526 may monitor user interactions that bend the display device. The bend determination module may determine the bend displacement described above and/or the force applied onto the display device.

The process 600 may continue with optional step 608, shown in phantom. The process 600 may continue with determining that a third user interaction caused the portion of the display device to be bent at a second bend angle that is larger than the first bend angle (608). For example, the user may bend the E-reader or tablet further in the first direction. A sensor and/or a module may determine the bending angle of the display device and the force applied onto the display device. For example, the sensor and/or the module may determine that the bending angle increased. Similarly, the sensor and/or the module may determine that the bending force increased. In turn, the process 600 continue, with optional step 610, by displaying, at a second rate that is higher than the first rate, pages consecutive to the first page, in response to determining that the display device is bent at a second bend angle (610). For example, responsive to determining that either the bending force increased or that the bending angle increased, the E-reader or tablet may display consecutive pages of the book at a higher rate and/or faster speed. In one example, the user may bend the E-reader or tablet further in order to flip through pages at a higher pace.

The process 600 may continue with the optional step 612. The process 600 may continue with receiving a fourth user interaction with the display device that causes the display device to return to a relaxed or original position, which in an illustrate embodiment may be straightened (612). For example, the user may stop bending the E-reader or the tablet. The process 600 may then end with the optional step 614. The process 600 may end with halting the display of pages consecutive to the first page (614). For example, the E-reader or the tablet may stop or halt flipping through the consecutive pages, in response to the user stopping the bending of the E-reader or the tablet. Similarly, the E-reader or the tablet may determine that the user reduced the bending force applied onto the E-reader or tablet or that the angle of bend decreased. In turn, the E-reader or tablet may reduce the rate or speed of displaying consecutive pages.

Figure 7:
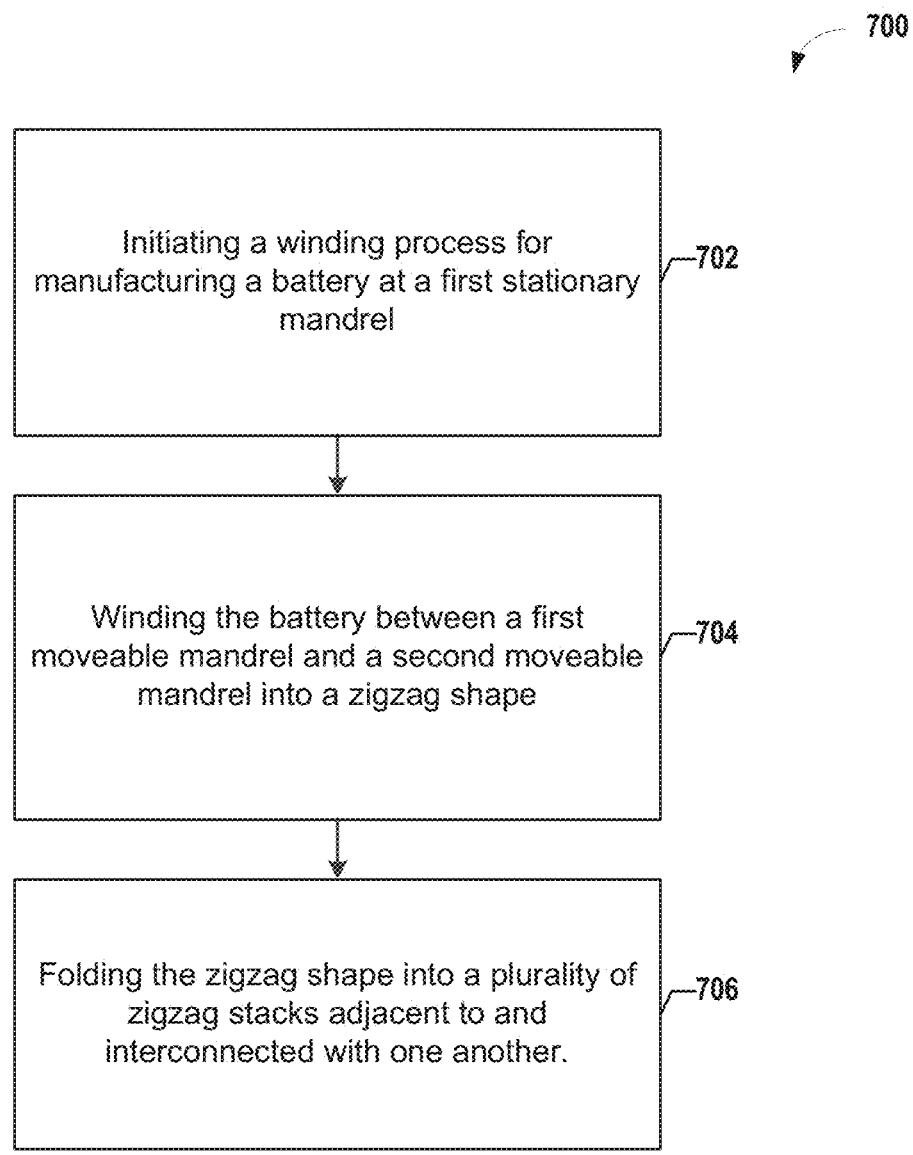

FIG. 7 is a flowchart of an example process 700 for manufacturing a battery in accordance with various embodiments of the disclosure. The process 700 may begin with initiating a winding process, for manufacturing a battery, at a first stationary mandrel (702). For example, a battery laminate may be secured between two stationary mandrels as depicted in FIG. 4C. In one implementation, the laminate may be drawn from a stationary spool.

The process 700 may continue with winding the battery between a first moveable mandrel and a second moveable mandrel into a zigzag shape (704). For example, the moveable mandrel may, in alternating fashion, move upward to secure a portion of laminate and fold it over the second moveable mandrel. The process may optionally be repeated. For example, the process may be repeated until enough laminate is folded for filling a pouch. Once the winding process is completed the mandrels may be removed or detached from the laminate.

The process 700 may then end with folding or placing the zigzag shape laminate into a plurality of zigzag stacks adjacent to and interconnected with one another (706). For example, similar to the description above, the zigzag shaped laminate may be folded and inserted into a pouch. In one implementation, the zigzag shaped laminate may be folded as depicted in FIG. 4C. In one implementation, the zigzag shaped laminate may be folded as depicted in FIG. 2B. Naturally, the zigzag shaped laminate may be folded into other shapes and configurations.

In some implementations, batteries may be coated after completion of the flattening process. In one implementation, coating may be applied to the battery to increase the stiffness of the battery. In some implementations, some portions of the battery may be coated with more coating than the other portions of the battery.

It should be understood that the processes, operations, and functionality described above may be performed by or implemented in or by a plurality of systems. For example, the processes, operations, and functionality above may be implemented in batteries, battery powered electronic devices, remote management systems, computing entities, and/or the like. The processes, operations, and functionality may be applied to batteries during operation and/or manufacturing.

It should be noted that the methods above may be modified in various ways in accordance with certain embodiments of the disclosure. For example, one or more operations of the methods above may be eliminated or executed out of order in other embodiments of the disclosure. Additionally, other operations may be added to the methods above in accordance with other embodiments of the disclosure.

Additional Implementation Details

Although an example processing system and/or device has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data including, by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of the client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:
1. A tablet device comprising:
a housing configured to bend about a longitudinal axis of the tablet device;
a display configured to bend about the longitudinal axis; and a flexible battery positioned within the tablet device and configured to bend about the longitudinal axis, the flexible battery comprising:
a first stack comprising a first portion of a battery laminate, the first portion of the battery laminate comprising:
a first portion of a cathode layer, a first portion of an anode layer, and a first portion of a separator layer, the first portion of the separator layer being positioned between the first portion of the cathode layer and the first portion of the anode layer;
a first segment of the battery laminate having a first surface and a second surface opposing the first surface, wherein an end of the first segment of the battery laminate is connected to a first end of a second segment of the battery laminate;
the second segment of the battery laminate having a third surface and a fourth surface opposing the third surface, wherein a second end of the second segment of the battery laminate is connected to an end of a third segment of the battery laminate, and wherein the second surface faces the third surface;
the third segment of the battery laminate having a fifth surface and a sixth surface opposing the fifth surface, wherein the fourth surface faces the fifth surface;
a second stack adjacent to the first stack and comprising a second portion of the battery laminate; and
a third portion of the battery laminate connecting the first stack and the second stack;
wherein the first portion of the battery laminate is arranged in zigzag configuration such that the second surface forms an acute angle with respect to the third surface and the fourth surface forms an acute angle with respect to the fifth surface.

2. The tablet of claim 1, wherein a first distance between opposing points on the second surface and the third surface is larger than a second distance between opposing points on the fourth surface and the fifth surface.

3. The tablet device of claim 1, wherein the first surface, second surface, third surface, fourth surface, fifth surface and sixth surface are coated with an inactive material.

4. The tablet device of claim 1, wherein the second portion of the battery laminate comprises:
a second portion of the cathode layer, a second portion of the anode layer, and a second portion of the separator layer, the second portion of the separator layer being positioned between the second portion of the cathode layer and the second portion of the anode layer;
a fourth segment of the battery laminate having a seventh surface and an eighth surface opposing the seventh surface, the fourth segment of the battery laminate being connected to a first end of a fifth segment of the battery laminate;
the fifth segment of the battery laminate having a ninth surface and a tenth surface opposing the ninth surface, wherein a second end of the fifth segment of the battery laminate is connected to a sixth segment of the battery laminate and wherein the eighth surface faces the ninth surface; and
the sixth segment of the battery laminate having an eleventh surface and a twelfth surface opposing the eleventh surface, wherein the tenth surface faces the eleventh surface.

5. A flexible battery comprising:
a first stack comprising a first portion of a battery laminate, the first portion of the battery laminate comprising:
a first portion of a cathode layer, a first portion of an anode layer, and a first portion of a separator layer;
a first segment of the battery laminate having a first surface and a second surface opposing the first surface, the first segment of the battery laminate being connected to a first end of a second segment of the battery laminate;
the second segment of the battery laminate having a third surface and a fourth surface opposing the third surface, wherein a second end of the second segment of the battery laminate is connected to a third segment of the battery laminate and wherein the second surface faces the third surface;
the third segment of the battery laminate having a fifth surface and a sixth surface opposing the fifth surface, wherein the fourth surface faces the fifth surface; and
a fourth segment of the battery laminate connected to the first segment, the fourth segment comprising a seventh surface that forms a substantially obtuse angle with respect to the first surface or the second surface.

6. The flexible battery of claim 5, wherein the first segment and the third segment are substantially a same dimension.

7. The flexible battery of claim 5, further comprising:
a flexible battery housing comprising a first lateral edge, a second lateral edge and, a longitudinal groove, wherein the first stack is positioned between the longitudinal groove and one of the first lateral edge or the second lateral edge.

8. The flexible battery of claim 5, wherein the first portion of the battery laminate is in a zigzag shape.

9. The flexible battery of claim 5, wherein a first portion of the second surface forms an acute angle with respect to a second portion of the third surface.

10. The flexible battery of claim 5, wherein a first distance between opposing points on the second surface and the third surface is larger than a second distance between opposing points on the fourth surface and the fifth surface.

11. The flexible battery of claim 5, wherein the battery laminate comprises:
a second stack adjacent to the first stack and comprising a second portion of the battery laminate, wherein the second portion of the battery laminate comprises:
a second portion of the cathode layer, a second portion of the anode layer, and a second portion of the separator layer; and
a third portion of the battery laminate connecting the first stack and the second stack.

12. The flexible battery of claim 11, wherein the third portion of the battery laminate is substantially straight.

13. The flexible battery of claim 5, wherein the first portion of the cathode layer comprises a first cathode layer surface and a second cathode layer surface, wherein the first cathode layer surface is coated with an active material and the second cathode layer surface is coated with an inactive material.

14. The flexible battery of claim 5, wherein the first portion of the anode layer comprises a first anode layer surface and a second anode layer surface, wherein the first anode layer surface is coated with an active material and the second anode layer surface is coated with an inactive material.

15. The flexible battery of claim 14, wherein the first portion of the separator layer is positioned between the first cathode layer surface and the first anode layer surface, wherein a first separator layer surface is in contact with the first cathode layer surface and a second separator layer surface is in contact with the first anode layer surface.

16. A battery comprising:
- a first segment of a cathode layer having a first surface and a second surface opposing the first surface, wherein an end of the first segment of the cathode layer is connected to a first end of a second segment of the cathode layer;
- the second segment of the cathode layer having a third surface and a fourth surface opposing the third surface, wherein a second end of the second segment of the cathode layer is connected to an end of a third segment of the cathode layer, and wherein the second surface faces the third surface;
- the third segment of the cathode layer having a fifth surface and a sixth surface opposing the fifth surface, wherein the fourth surface faces the fifth surface; and
- a fourth segment of the cathode layer connected to the first segment, the fourth segment comprising a surface that forms a substantially obtuse angle with respect to the first surface or the second surface.

17. The battery of claim 16, wherein first surface and the fourth surface are coated with an inactive material.

18. The battery of claim 16, wherein the second surface and the third surface are coated with an active material.

19. The battery of claim 16, wherein a first portion of the second surface forms an acute angle with respect to a second portion of the third surface.

20. The battery of claim 16, further comprising:
- a first segment of an anode layer having a sixth surface and a seventh surface opposing the first surface, wherein an end of the first segment of the anode layer is connected to a first end of a second segment of the anode layer and wherein the first segment of the anode layer is adjacent to the first segment of the cathode layer;
- the second segment of the anode layer having an eighth surface and a ninth surface opposing the eighth surface, wherein a second end of the second segment of the anode layer is connected to an end of a third segment of the anode layer, and wherein the seventh surface faces the eighth surface and wherein the second segment of the anode layer is adjacent to the second segment of the cathode layer; and
- the third segment of the anode layer having a tenth surface and an eleventh surface opposing the tenth surface, wherein the ninth surface faces the tenth surface and wherein the third segment of the anode layer is adjacent to the third segment of the cathode layer.

* * * * *